(12) United States Patent
Hu

(10) Patent No.: US 12,504,162 B2
(45) Date of Patent: Dec. 23, 2025

(54) MOISTURE-PROOF AND OXIDATION-RESISTANT LED PIN CONNECTION PACKAGING STRUCTURE

(71) Applicant: Shenzhen Linktop IOT Co., Ltd, Shenzhen (CN)

(72) Inventor: Peipei Hu, Shenzhen (CN)

(73) Assignee: Shenzhen Linktop IOT Co., Ltd, Shenzhen (CN)

(*) Notice: Subject to any disclaimer, the term of this patent is extended or adjusted under 35 U.S.C. 154(b) by 0 days.

(21) Appl. No.: 19/260,445

(22) Filed: Jul. 5, 2025

(65) Prior Publication Data
US 2025/0334262 A1    Oct. 30, 2025

(30) Foreign Application Priority Data

Apr. 3, 2025    (CN) .................. 202510418920.3

(51) Int. Cl.
| | | |
|---|---|---|
| *F21V 31/00* | (2006.01) | |
| *F21V 23/04* | (2006.01) | |
| *F21V 29/90* | (2015.01) | |
| *F21Y 115/10* | (2016.01) | |

(52) U.S. Cl.
CPC ............ *F21V 31/005* (2013.01); *F21V 23/04* (2013.01); *F21V 29/90* (2015.01); *F21Y 2115/10* (2016.08)

(58) Field of Classification Search
CPC ............................ H05B 33/04; H10H 20/036
See application file for complete search history.

(56) References Cited

U.S. PATENT DOCUMENTS

| | | | |
|---|---|---|---|
| 2010/0219443 A1 | 9/2010 | Song | |
| 2012/0025241 A1 | 2/2012 | Xiao et al. | |
| 2013/0026516 A1 | 1/2013 | Wang et al. | |
| 2013/0188357 A1* | 7/2013 | Sloan | F21S 4/10 |
| | | | 362/249.01 |
| 2014/0209928 A1* | 7/2014 | Teng | H01L 25/167 |
| | | | 257/82 |
| 2019/0013304 A1* | 1/2019 | Luo | H10H 20/856 |

* cited by examiner

*Primary Examiner* — Zheng Song
(74) *Attorney, Agent, or Firm* — Zhigang Ma

(57) ABSTRACT

The invention provides a moisture-proof and oxidation-resistant LED pin connection packaging structure and relates to the technical field of packaging structures. The moisture-proof and oxidation-resistant LED pin connection packaging structure includes: a packaging box, surface-mounted heating resistors, first trigger switches and second trigger switchers. The invention realizes fully automatic control of the packaging process through the collaborative action of elastic sheets and the trigger switches. Without the need of external control equipment, the mechanism accurately completes the entire process of heating, sealing and power-off through physical deformation and dynamic feedback on a hot melt glue state. The tightness of a sealing layer is ensured and the packaging time is reduced to ⅓ of that of conventional processes, thereby significantly improving production efficiency and energy utilization.

10 Claims, 10 Drawing Sheets

MOISTURE-PROOF AND OXIDATION-RESISTANT LED PIN CONNECTION PACKAGING STRUCTURE

BACKGROUND OF THE INVENTION

Technical Field

The present invention relates to the technical field of packaging structures and, in particular, to a moisture-proof and oxidation-resistant LED pin connection packaging structure.

Description of Related Art

Light emitting diode (LED) is a semiconductor device that converts electrical energy into light energy based on the principle of electroluminescence. Its core structure is a PN junction. When current passes through, electrons and holes combine to release photons to realize light emission. The packaging of the LED is a key process which determines the performance, life and application scenario of the LED.

In the traditional LED packaging process, the connection between the pins and a power cord usually relies on potting glue or epoxy resin sealing, which needs to be cured by external heating equipment. The process is cumbersome and time-consuming. In addition, the gap between the pins and the package is more likely to cause water vapor penetration, accelerating the pin oxidation and affecting the life of the LED. In addition, external heating equipment needs to continuously work until the glue cures, resulting in low energy utilization.

BRIEF SUMMARY OF THE INVENTION

An objective of the present invention is to provide a moisture-proof and oxidation-resistant LED pin connection packaging structure to solve the problem that the traditional LED pin packaging process is cumbersome and time-consuming as stated in the above background.

In order to solve the above technical problem, the technical solution adopted by the present invention is a moisture-proof and oxidation-resistant LED pin connection packaging structure, including: an LED to be packaged and a packaging box. An anode pin and a cathode pin are arranged at the bottom of the LED to be packaged, and the anode pin and the cathode pin are connected to a power cord through solder.

The packaging box wraps joints between the anode pin and cathode pin of the LED to be packaged and the power cord; hot melt glue sheets are arranged in the packaging box, and surface-mounted heating resistors are also arranged in the packaging box. Each of the surface-mounted heating resistors is electrically connected to a first trigger switch and a second trigger switch. The first trigger switches and the second trigger switches are turned off after the hot melt glue sheets are melted.

Further, the packaging box includes an upper packaging cover and a lower packaging cover. One sides of the upper packaging cover and the lower packaging cover are rotatably connected by a hinge, and the other sides of the upper packaging cover and the lower packaging cover are snap-connected by a buckle. The upper packaging cover and the lower packaging cover form an openable and closable enclosed cavity by the hinge and the buckle to provide physical protection for the pins and the power cord. The buckle structure ensures tightness when the enclosed cavity is closed, thereby preventing the intrusion of external moisture.

Further, an elastic sheet is arranged on each of the upper packaging cover and the lower packaging cover, one sides of the elastic sheets are fixedly connected to the upper packaging cover and the lower packaging cover, the other three sides of the elastic sheets are separated from the upper packaging cover and the lower packaging cover, the cross section of each elastic sheet is trapezoidal, and the thickness of the one sides of the elastic sheets fixedly connected to the upper packaging cover and the lower packaging cover is less than that of the other sides opposite thereto. When the elastic sheets are not pressed, outer surfaces of the elastic sheets are flush with outer walls of the upper packaging cover and the lower packaging cover, and inner surfaces of the elastic sheets protrude from inner walls of the upper packaging cover and the lower packaging cover. When the packaging box is closed, the elastic sheets are pressed and deformed, triggering the circuit connection of the heating resistor. Due to the trapezoidal cross-section design, when returning, the elastic sheets produce elasticity, which assists the hot melt glue to fill and seal gaps. In the meanwhile, the protruding inner surfaces ensure reliable contact of the trigger switches.

Further, the surface-mounted heating resistor is pasted on the inner side of each elastic sheet. The heating resistors are directly close to the hot melt glue sheet, shortening the heat transfer path and improving heating efficiency. Moreover, the deformation of the elastic sheets drives the heating resistors to displace synchronously, ensuring the collaborative action of circuit triggering and the hot melting process.

Further, anodes of the surface-mounted heating resistors are electrically connected to the first trigger switches. One ends of the first trigger switches are electrically connected to the anode pin of the LED to be packaged. Each first trigger switch includes a first elastic contact piece and a first fixed contact piece. The first elastic contact piece is pasted on the thicker end of the corresponding elastic sheet. The first elastic contact piece is connected to the anode of the corresponding surface-mounted heating resistor. First sealing grooves are formed at one ends of the upper packaging cover and the lower packaging cover close to the LED to be packaged. The first fixed contact pieces are clamped in the first sealing grooves. The first fixed contact pieces are in contact with the anode pin of the LED to be packaged. The first trigger switches are closed when the elastic sheets are pressed, so that the heating resistors are in circuit connection with the anode pin. The fixed contact pieces in the sealing grooves ensure stable contact between the pin and the contact pieces, and moreover, the sealing grooves guide the hot melt glue to fill the gap between the pin and the box body.

Further, the second trigger switches are electrically connected to cathodes of the surface-mounted heating resistors. One ends of the second trigger switches are electrically connected to the cathode pin of the LED to be packaged. Each second trigger switch includes a second elastic contact piece and a second fixed contact piece. The second elastic contact piece is pasted on the thicker end of the corresponding elastic sheet. The second elastic contact piece is connected to the cathode of the corresponding surface-mounted heating resistor. The second fixed contact pieces are clamped in the first sealing grooves. The second fixed contact pieces are in contact with the cathode pin of the LED to be packaged. The second trigger switches work together with the first trigger switches to form a complete loop of the heating resistors. The dual trigger structure ensures the reliability of circuit connection, and the fixed contact pieces in the sealing grooves realize the electrical connection and physical sealing of the cathode pin.

Further, a hot melt glue sheet is arranged in each of the upper packaging cover and the lower packaging cover, and the size of the hot melt glue sheets is consistent with internal sizes of the upper packaging cover and the lower packaging cover. After being heated and melted, the hot melt glue sheets fill the gap between pins and the gaps between the pines and the box body to form a continuous sealing layer to isolate water vapor and oxygen. The size design consistent with the size of the box body ensures sealing integrity.

Further, two first inner openings are formed in an inner side of each first sealing groove, and first outer openings are formed in an outer side of each first sealing groove. The positions of the two first inner openings and the two first outer openings respectively correspond to the positions of the anode pin and cathode pin of the LED to be packaged. The stepped opening design guides the melted hot melt glue to overflow and fill the sealing grooves, forming a double seal. The misaligned structure of the inner openings and the outer openings enhances the tightness between the pins and the box body and prevents moisture intrusion.

Further, second sealing grooves are formed at one ends of the upper packaging cover and the lower packaging cover close to the power cord, second inner openings are formed in an inner side of each second sealing groove, and second outer openings are formed in an outer side of each second sealing groove. The positions of the second inner openings and the second outer openings correspond to the position of the power cord. The second sealing grooves cooperate with the first sealing grooves to seal the pins and the power cord respectively. The misaligned design of the inner and outer openings ensures the tightness between the power cord and the box body and prevents moisture intrusion at multiple joints.

Further, the diameter of the first outer openings is greater than the diameters of the anode pin and the cathode pin, the diameter of the first inner openings is greater than the diameter of the first outer openings, and the diameter of the second inner openings is greater than the diameter of the second outer openings. The stepped openings form a "narrow opening-wide opening" structure, allowing the hot melt glue to overflow and cure into a boss and enhancing the mechanical strength of the sealing layer. The larger inner openings ensure adequate filling of hot melt glue and the smaller outer openings limit excessive loss of glue liquid, thereby optimizing the sealing effect.

Compared with the prior art, the beneficial effects of the present invention are as follows:

The moisture-proof and oxidation-resistant LED pin connection packaging structure of the present disclosure realizes fully automatic control of the packaging process through the collaborative action of the elastic sheets and the trigger switches: when the packaging box is closed, the elastic sheets are pressed and deformed to turn on the first and second trigger switches, and the surface-mounted heating resistors start to heat the hot melt glue sheets; when the melted hot melt glue fills the gaps and overflows into the sealing grooves, the elastic sheets return to original positions thereof due to pressure removal, the trigger switches are turned off, the heating resistors are automatically powered off, and the LED emits light again. Without the need of external control equipment, the mechanism accurately completes the entire process of heating, sealing and power-off through physical deformation and dynamic feedback on the hot melt glue state. In this way, the tightness of the sealing layer is ensured and the packaging time is reduced to ⅓ of that of conventional processes, thereby significantly improving production efficiency and energy utilization.

BRIEF DESCRIPTION OF THE SEVERAL VIEWS OF THE DRAWINGS

The disclosure of the present invention is explained with reference to the accompanying drawings. It should be understood that the drawings are for illustrative purposes only and are not intended to limit the scope of the present invention. In the drawings, like reference numerals are used to refer to like parts.

Figure 1:
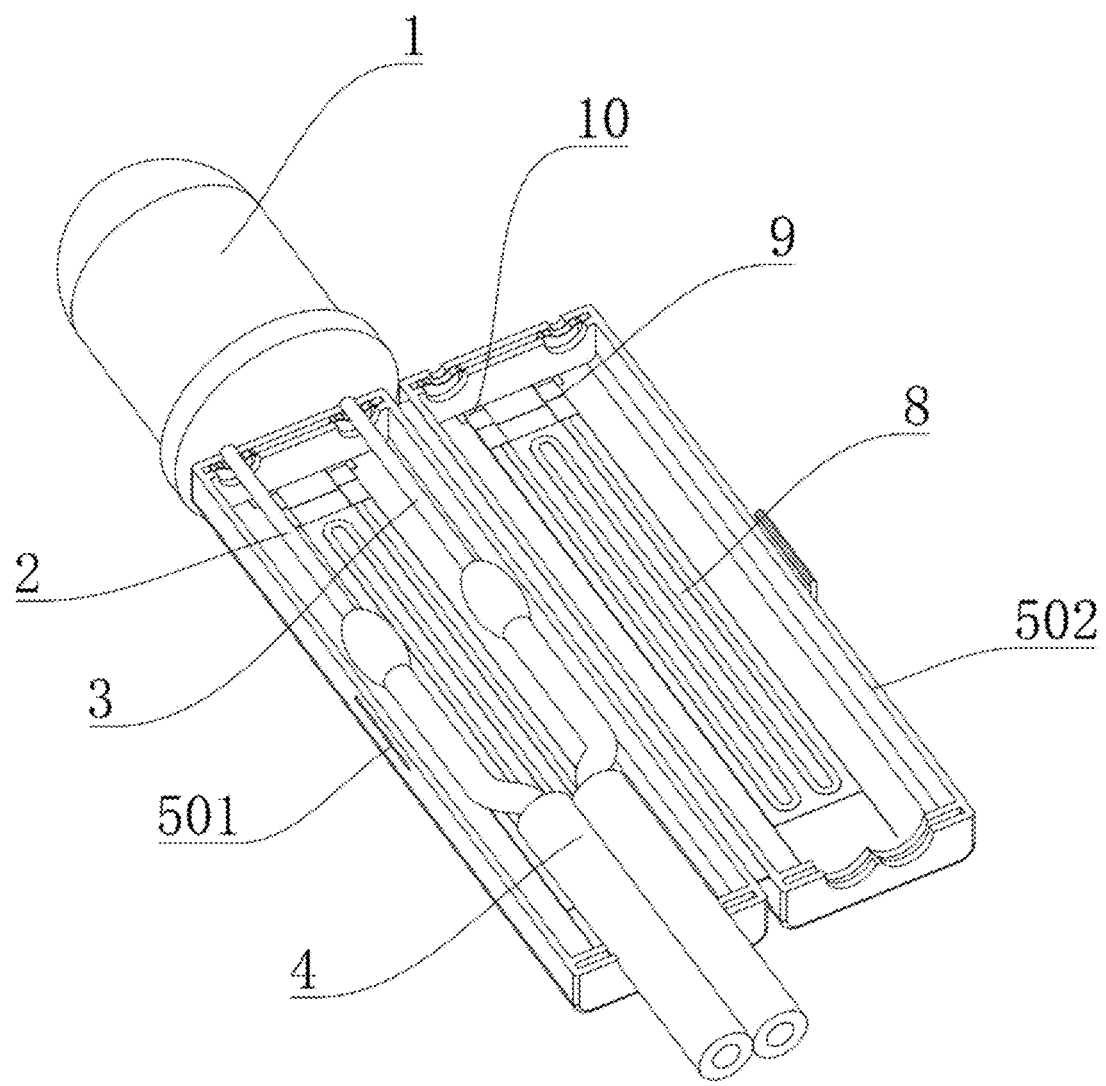
FIG. 1 is a schematic diagram of a moisture-proof and oxidation-resistant LED pin connection packaging structure according to an embodiment of the present invention, with a packaging box being opened.

Reference numerals: 1. LED to be packaged; 2. anode pin; 3. cathode pin; 4. power cord; 5. packaging box; 501. upper packaging cover; 502. lower packaging cover; 6. buckle; 7. elastic sheet; 8. surface-mounted heating resistor; 9. first trigger switch; 901. first elastic contact piece; 902. first fixed contact piece; 10. second trigger switch; 1001. second elastic contact piece; 1002. second fixed contact piece; 11. first sealing groove; 1101. first inner opening; 1102. first outer opening; 12. second sealing groove; 1201. second inner opening; 1202. second outer opening; 13. hot melt glue sheet.

DETAILED DESCRIPTION OF THE INVENTION

It is easy to understand that according to the technical solutions of the present invention, those of ordinary skill in the art can provide multiple alternative structural patterns and implementation methods without changing the essential spirit of the present invention. Therefore, the following specific embodiments and drawings are only exemplary illustrations of technical solutions of the present invention, and should not be regarded as the entire invention or as restrictions or limitations on the technical solutions of the present invention.

The implementation object of the present invention is a light emitting diode (LED) 1 to be packaged. The LED 1 to be packaged is provided with an anode pin 2 and a cathode pin 3. The anode pin 2 and the cathode pin 3 are key components for connecting the LED 1 to be packaged with an external power supply and are used for transmitting electrical energy to ensure that the LED 1 can normally obtain power supply and emit light. The anode pin 2 and the cathode pin 3 are connected with a power cord 4 through solder. The power cord 4 provides a stable power input for the LED 1 to be packaged, ensuring that the LED emits light continuously and stably. The power cord 4, together with the anode pin 2 and the cathode pin 3, forms a passage for power transmission.

Figure 2:
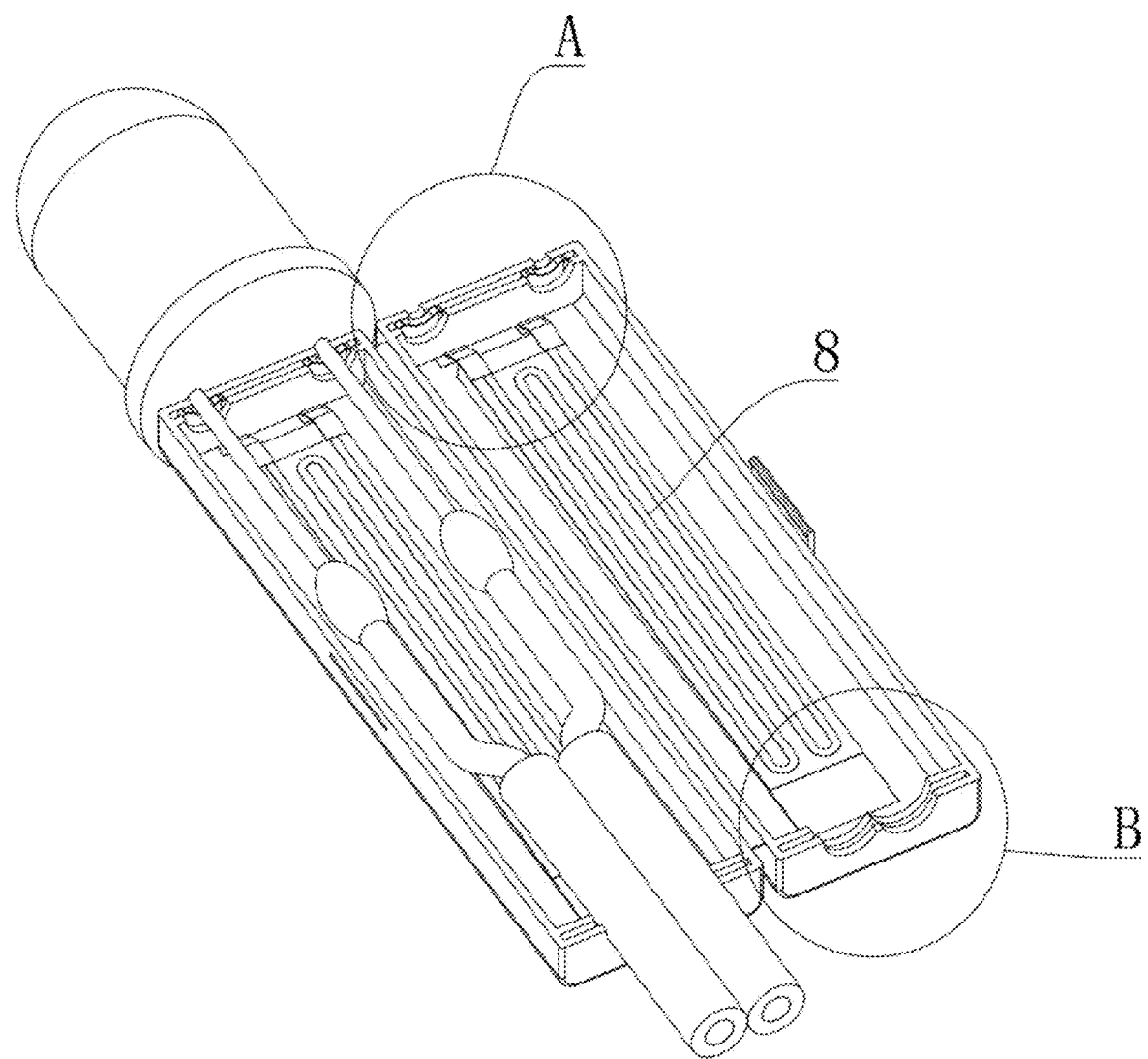
FIG. 2 is a partial structural diagram of the packaging box of the moisture-proof and oxidation-resistant LED pin connection packaging structure according to an embodiment of the present invention.
Figure 3:
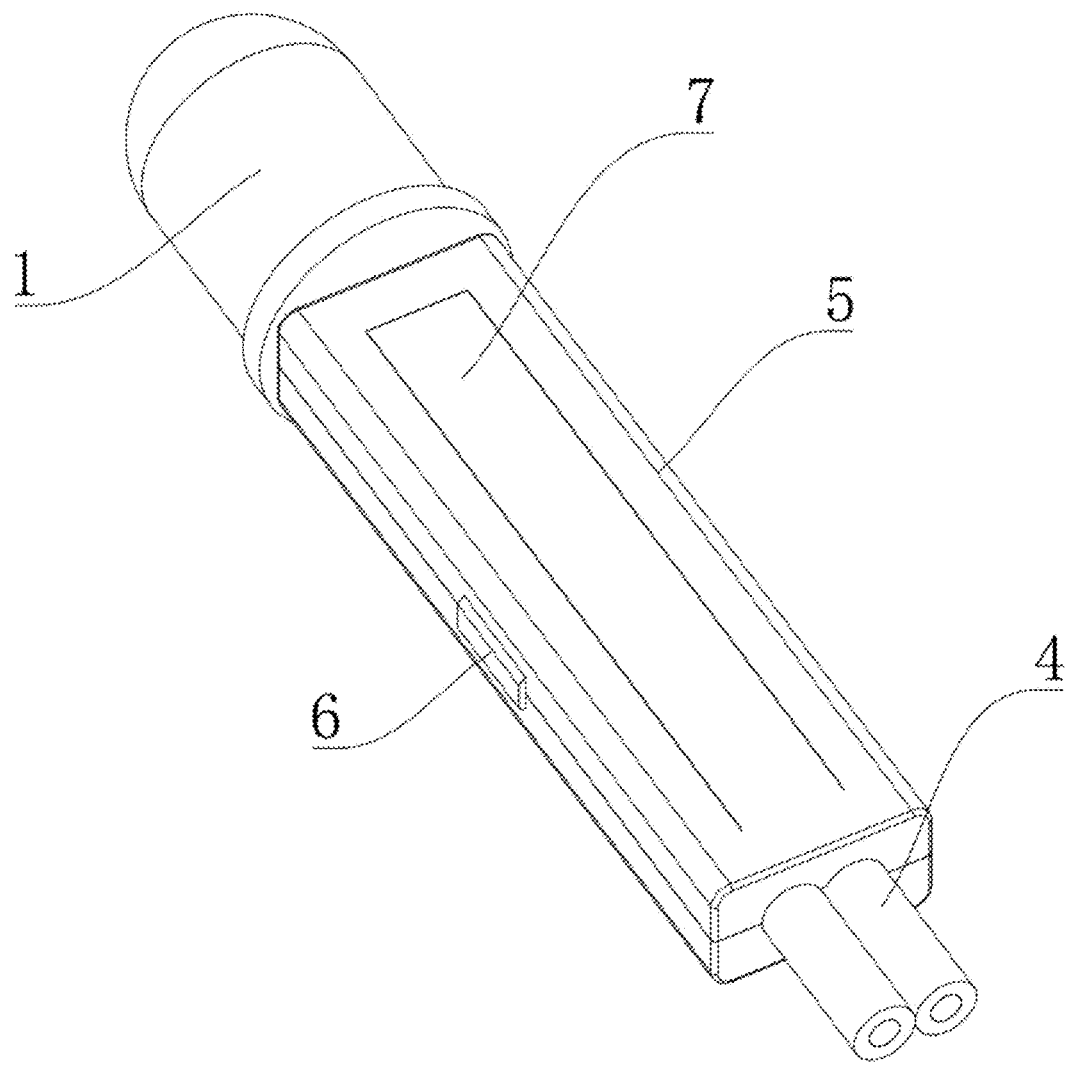
FIG. 3 is a schematic structural diagram of the moisture-proof and oxidation-resistant LED pin connection packaging structure according to an embodiment of the present invention, with elastic sheets being not pressed.
Figure 4:
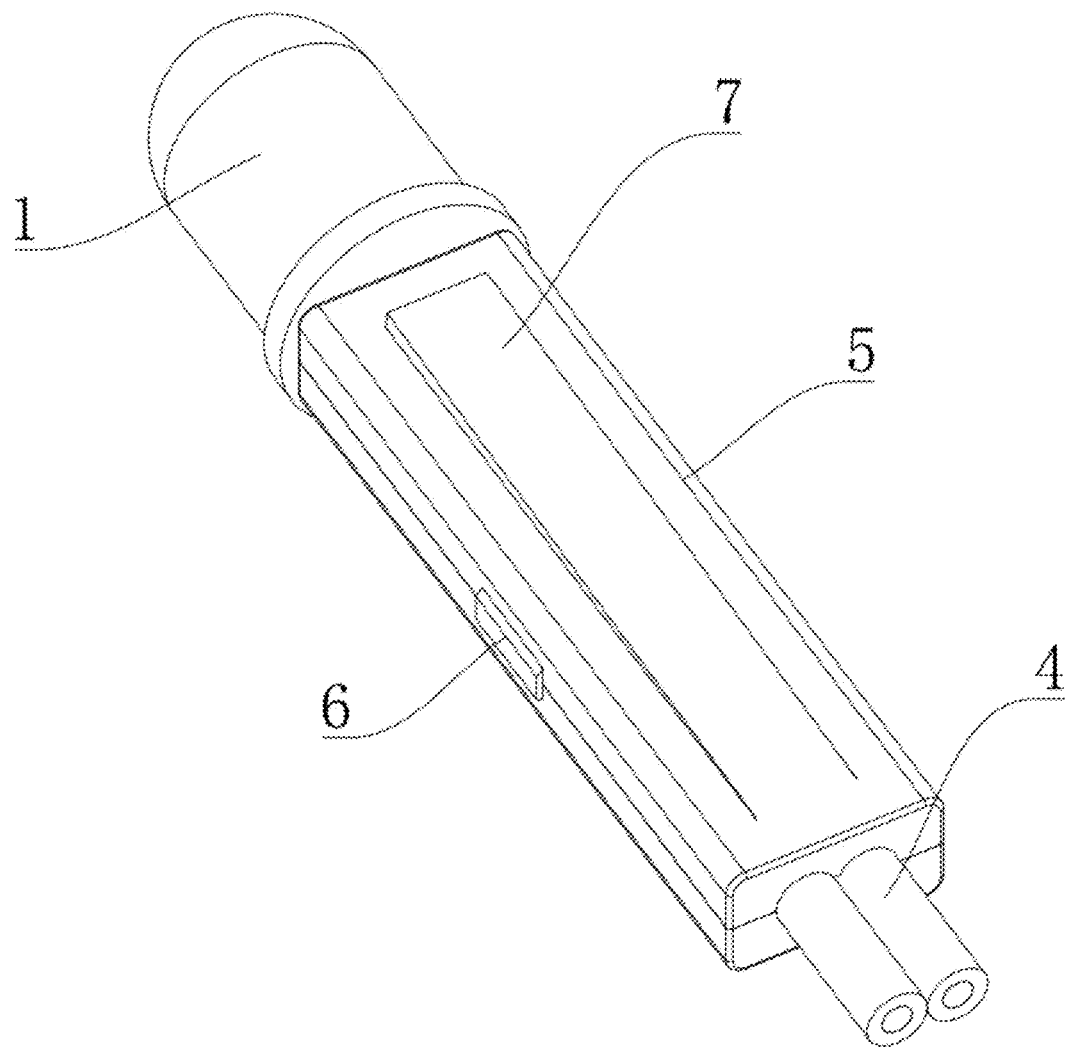
FIG. 4 is a schematic structural diagram of the moisture-proof and oxidation-resistant LED pin connection packaging structure according to an embodiment of the present invention, with elastic sheets being pressed.
Figure 5:
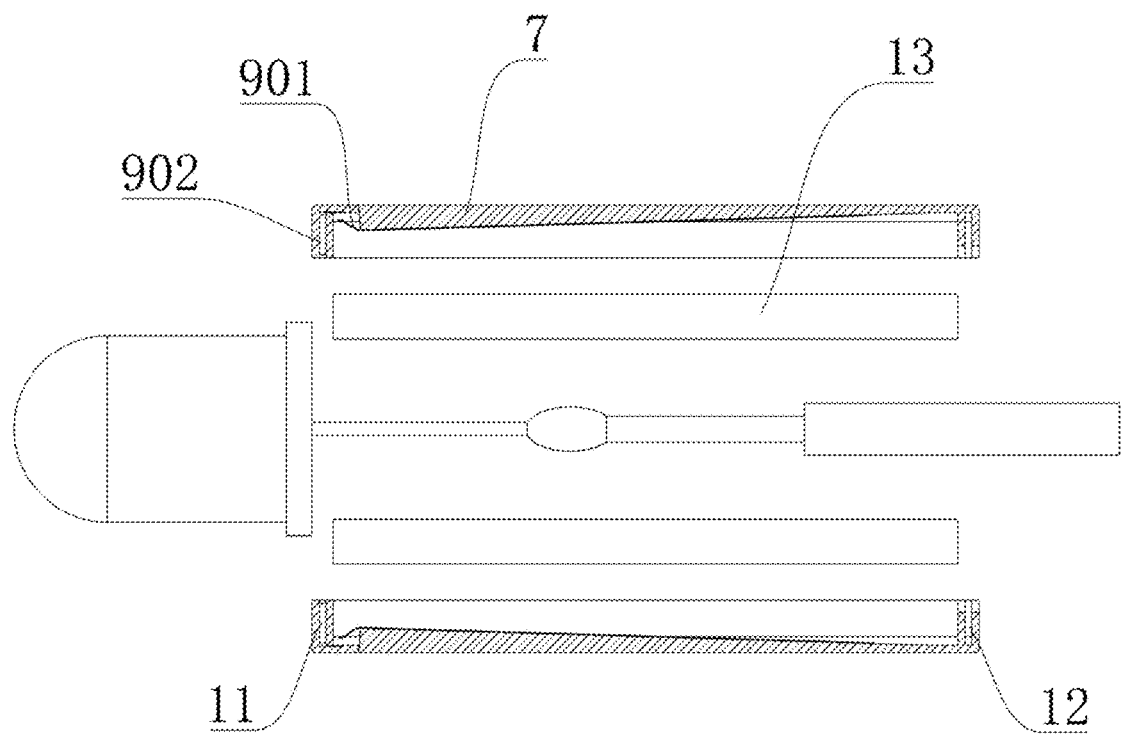
FIG. 5 is a schematic cross-section diagram of the moisture-proof and oxidation-resistant LED pin connection packaging structure according to an embodiment of the present invention, with elastic sheets being not pressed.
Figure 6:
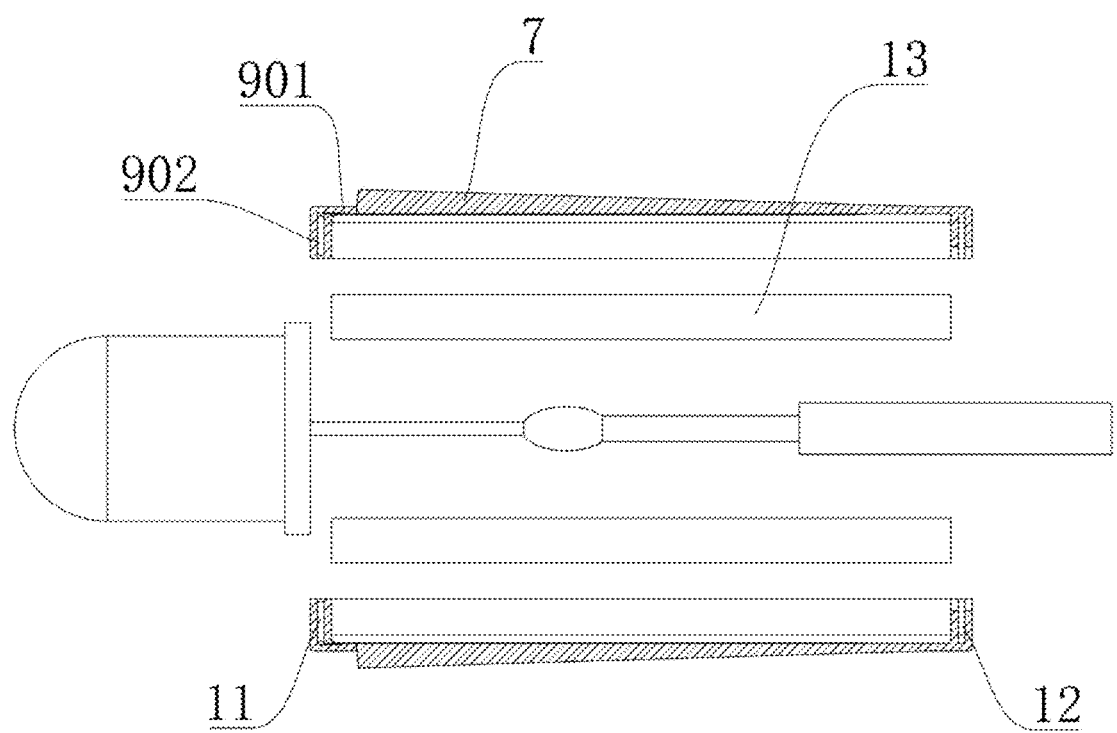
FIG. 6 is a schematic cross-section diagram of the moisture-proof and oxidation-resistant LED pin connection packaging structure according to an embodiment of the present invention, with elastic sheets being pressed.
Figure 7:
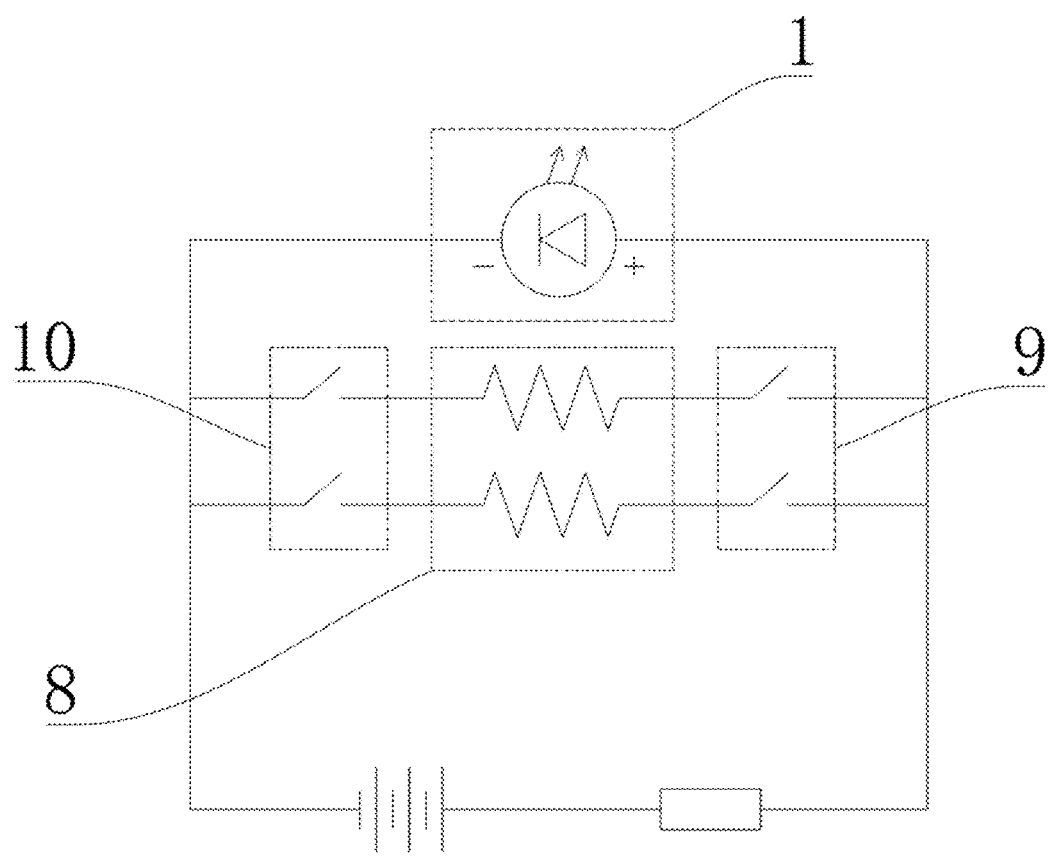
FIG. 7 is a schematic diagram of a detection circuit of the moisture-proof and oxidation-resistant LED pin connection packaging structure according to an embodiment of the present invention.
Figure 8:
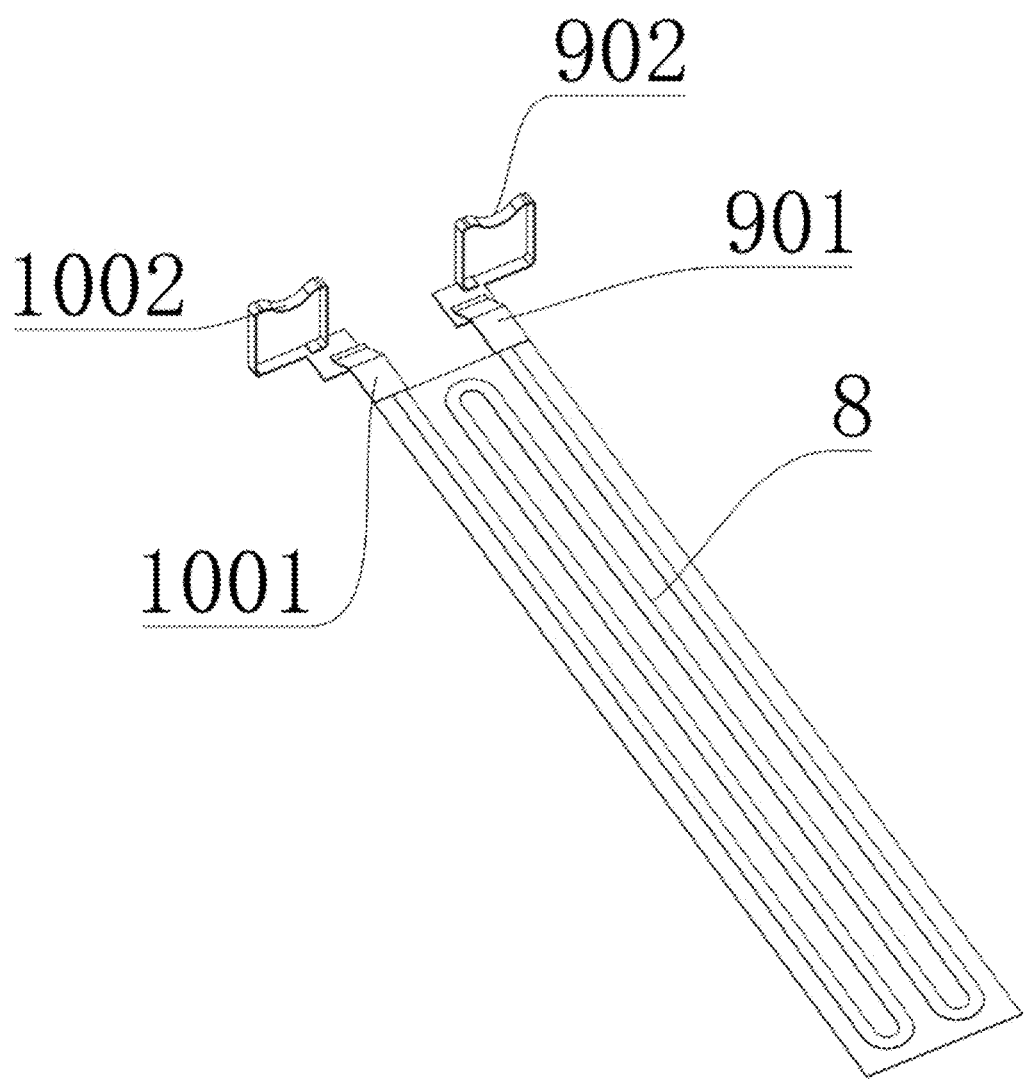
FIG. 8 is a schematic structural diagram of a surface-mounted heating resistor, a first trigger switch and a second trigger switch in the moisture-proof and oxidation-resistant LED pin connection packaging structure according to an embodiment of the present invention.
Figure 9:
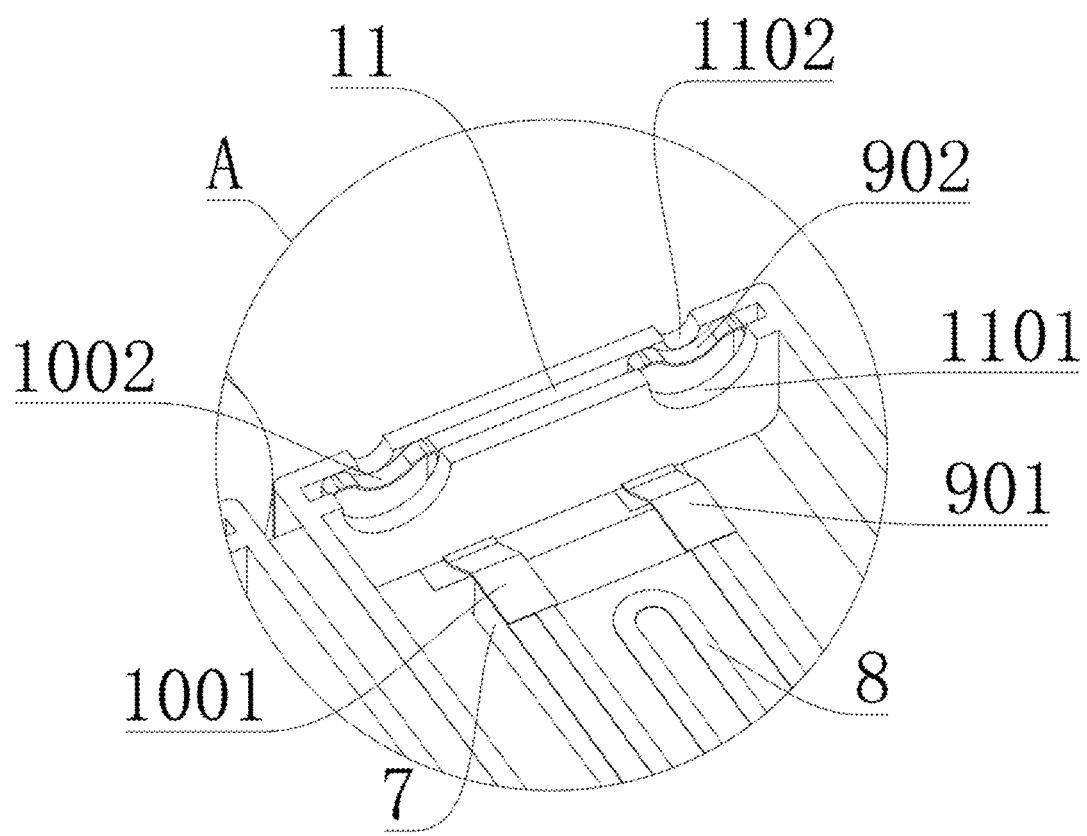
FIG. 9 is an enlarged structural diagram of part A in FIG. 2 of the moisture-proof and oxidation-resistant LED pin connection packaging structure according to an embodiment of the present invention.
Figure 10:
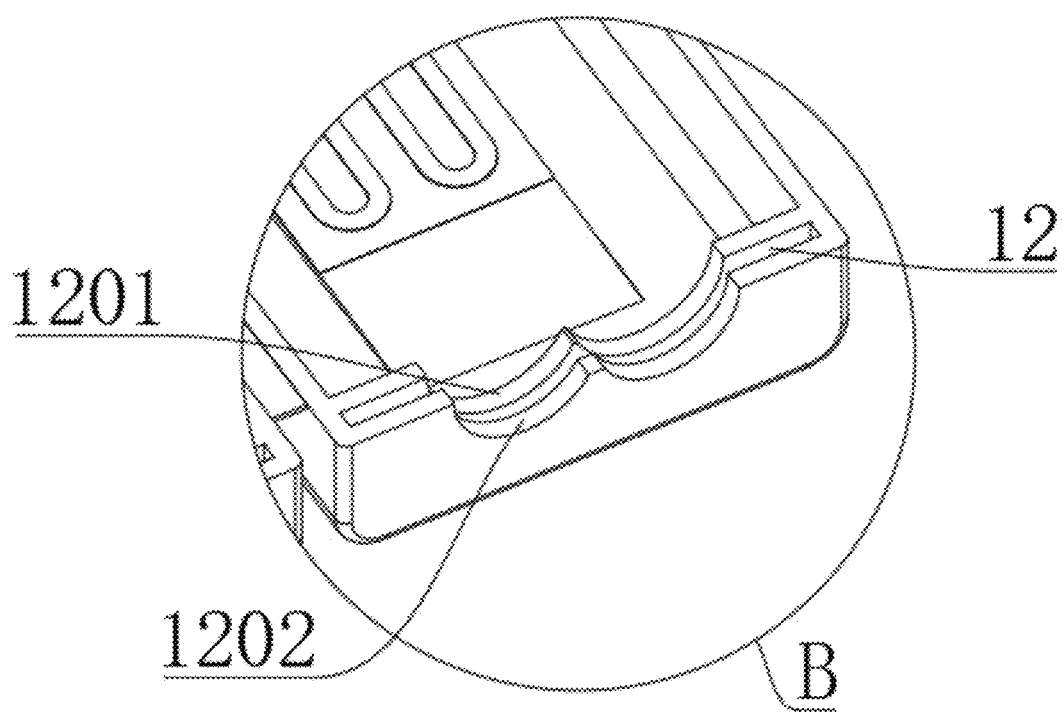
FIG. 10 is an enlarged structural diagram of part B in FIG. 2 of the moisture-proof and oxidation-resistant LED pin connection packaging structure according to an embodiment of the present invention.

Embodiment 1: Embodiments according to the present invention are shown in conjunction with FIGS. 1-10. A moisture-proof and oxidation-resistant LED pin connection packaging structure includes a packaging box 5. The packaging box 5 provides a closed space for the entire packaging structure, effectively blocks external moisture and oxygen, achieves moisture-proof and oxidation-resistant effects, and protects the LED 1 therein and the pins and other components of the LED 1. The packaging box 5 includes an upper packaging cover 501 and a lower packaging cover 502. The upper packaging cover 501 and the lower packaging cover 502 cooperate with each other to form a complete structure of the packaging box 5. The upper packaging cover 501 and the lower packaging cover 502 wrap therein the LED 1 to be packaged and the pins of the LED 1 by a specific connection method, forming a relatively independent space. One sides of the upper packaging cover 501 and the lower packaging cover 502 are rotatably connected by a hinge. This connection method allows the upper packaging cover 501 and the lower packaging cover 502 to be easily opened and closed, and it is convenient to place the LED 1 to be packaged inside the packaging box 5 for packaging operation. The other sides of the upper packaging cover 501 and the lower packaging cover 502 are snap-connected by a buckle 6. The buckle 6 ensures that the upper packaging cover 501 and the lower packaging cover 502 are tightly combined and prevents the packaging box 5 from being accidentally opened during use, thereby ensuring the stability and tightness of the packaging structure.

An elastic sheet 7 is arranged on each of the upper packaging cover 501 and the lower packaging cover 502, and the elastic sheets 7 play a key role in triggering and assisting sealing during the packaging process. One sides of the elastic sheets 7 are fixedly connected to the upper packaging cover 501 and the lower packaging cover 502, the other three sides of the elastic sheets 7 are separated from the upper packaging cover 501 and the lower packaging cover 502, the cross section of each elastic sheet 7 is trapezoidal, and the thickness of the one sides of the elastic sheets 7 fixedly connected to the upper packaging cover 501 and the lower packaging cover 502 is less than that of the other sides opposite thereto. The elastic sheets 7 have elasticity. When the elastic sheets 7 are not pressed, outer surfaces of the elastic sheets 7 are flush with outer walls of the upper packaging cover 501 and the lower packaging cover 502, and inner surfaces of the elastic sheets 7 protrude from inner walls of the upper packaging cover 501 and the lower packaging cover 502. When the upper packaging cover 501 and the lower packaging cover 502 are closed and press the hot melt glue sheets 13, the elastic sheets 7 will be pressed and deformed, and the deformation of the elastic sheets 7 trigger subsequent circuit connections. Moreover, during the melting and curing process of the hot melt glue, the elasticity of the elastic sheets 7 helps the hot melt glue to better fill the space and achieve sealing.

A surface-mounted heating resistor 8 is pasted on the inner side of each elastic sheet 7. The surface-mounted heating resistor 8 is a key component for realizing hot melt packaging and configured to convert electrical energy into heat energy. Anodes of the surface-mounted heating resistors 8 are connected to first trigger switches 9. One ends of the first trigger switches 9 are connected to the anode pin 2 of the LED 1 to be packaged. Each first trigger switch 9 includes a first elastic contact piece 901 and a first fixed contact piece 902. The first elastic contact piece 901 is pasted on the thicker end of the corresponding elastic sheet 7. The first elastic contact piece 901 is connected to the anode of the corresponding surface-mounted heating resistor 8. First sealing grooves 11 are formed at one ends of the upper packaging cover 501 and the lower packaging cover 502 close to the LED 1 to be packaged. The first fixed contact pieces 902 are clamped in the first sealing grooves 11. The first fixed contact pieces 902 are in contact with the anode pin 2 of the LED 1 to be packaged. When the elastic sheets 7 are pressed and deformed, the first elastic contact pieces 901 come into contact with the first fixed contact pieces 902, so that connection between the surface-mounted heating resistors 8 and the anode pin 2 of the LED 1 to be packaged is turned on, and the surface-mounted heating resistors 8 are provided with power to generate heat.

Cathodes of the surface-mounted heating resistors 8 are connected to second trigger switches 10. One ends of the second trigger switches 10 are connected to the cathode pin 3 of the LED 1 to be packaged. Each second trigger switch 10 includes a second elastic contact piece 1001 and a second fixed contact piece 1002. The second elastic contact piece 1001 is pasted on the thicker end of the corresponding elastic sheet 7. The second elastic contact piece 1001 is connected to the cathode of the corresponding surface-mounted heating resistor 8. The second fixed contact pieces 1002 are clamped in the first sealing grooves 11. The second fixed contact pieces 1002 are in contact with the cathode pin 3 of the LED 1 to be packaged. In cooperation with the first trigger switches 9, when the elastic sheets 7 are deformed, the second elastic contact pieces 1001 come into contact with the second fixed contact pieces 1002, so that the connection between the surface-mounted heating resistors 8 and the cathode pin 3 of the LED 1 to be packaged is turned on, thereby forming a complete circuit, allowing the surface-mounted heating resistors 8 to work normally to generate heat.

A hot melt glue sheet 12 is arranged in each of the upper packaging cover 501 and the lower packaging cover 502, and the size of the hot melt glue sheets 13 is consistent with internal sizes of the upper packaging cover 501 and the lower packaging cover 502. The hot melt glue sheets 13 are melted under the action of heat generated by the surface-mounted heating resistors 8, and the melted hot melt glue fills the space around the anode pin 2 and cathode pin 3 of the LED 1 to be packaged and the gap between the upper packaging cover 501 and the lower packaging cover 502 to form a sealing layer, thereby effectively preventing moisture and oxygen from entering, and achieving the moisture-proof and oxidation-resistant effects.

Two first inner openings 101 are formed in an inner side of each first sealing groove 11, and first outer openings 1102 are formed in an outer side of each first sealing groove 11. The positions of the two first inner openings 1101 and the two first outer openings 1102 respectively correspond to the positions of the anode pin 2 and cathode pin 3 of the LED 1 to be packaged. The diameter of the first outer openings 1102 is greater than the diameters of the anode pin 2 and the cathode pin 3, and the diameter of the first inner openings 1101 is greater than the diameter of the first outer openings 1102. The first sealing grooves 11 and the corresponding opening structure thereof guide excess hot melt glue into the first sealing grooves 11 after the hot melt glue is melted, further enhancing the sealing effect between the anode pin 2 and cathode pin 3 and the packaging box 5. Moreover, this stepped opening design helps the hot melt glue to achieve better filling and sealing effects, preventing external moisture and oxygen from entering via the joints between the pins and the packaging box 5.

Second sealing grooves 12 are formed at one ends of the upper packaging cover 501 and the lower packaging cover 502 close to the power cord, second inner openings 1201 are formed in an inner side of each second sealing groove 12, and second outer openings 1202 are formed in an outer side of each second sealing groove 12. The positions of the second inner openings 1201 and the second outer openings 1202 correspond to the position of the power cord 4. The diameter of the second inner openings 1201 is greater than the diameter of the second outer openings 1202. The second sealing grooves 12 and the opening structures thereof have similar functions to the first sealing grooves 11 to seal the joint between the power cord 4 and the packaging box 5, thereby preventing moisture and oxygen from entering the inside of the packaging box 5 from the position where the power cord 4 is led in. Working together with the first sealing grooves 11, the second sealing grooves 12 comprehensively improve the moisture-proof and oxidation-resistant performance of the packaging structure.

Working principle: Firstly, in a standby state, the elastic sheets 7 are not pressed, the outer surfaces of the elastic sheets 7 are flush with the outer walls of the upper packaging cover 501 and the lower packaging cover 502, and the inner surfaces of the elastic sheets 7 protrude from the inner walls of the upper packaging cover 501 and the lower packaging cover 502. In this case, the first trigger switches 9 and the second trigger switches 10 are both turned off, Specifically, the one sides of the elastic sheets 7 protruding from the inner walls of the upper packaging cover 501 and the lower packaging cover 502 lift the first elastic contact pieces 901 and the second elastic contact pieces 1001, so that the first elastic contact pieces 901 do not come into contact with the first fixed contact pieces 902, and the second elastic contact pieces 1001 do not come into contact with the second fixed contact pieces 1002.

During the packaging process, firstly, the anode pin 2 and the cathode pin 3 of the LED 1 to be packaged are sandwiched between the upper packaging cover 501 and the lower packaging cover 502. The two hot melt glue sheets 13 in the upper packaging cover 501 and the lower packaging cover 502 sandwich the anode pin 2 and the cathode pin 3 of the LED 1 to be packaged. When the upper packaging cover 501 and the lower packaging cover 502 are fastened by the buckle 6, the hot melt glue sheets 13 are pressed, and then the hot melt glue sheets 13 press the elastic sheets 7 outward, so that the inner sides of the elastic sheets 7 are flush with the inner walls of the upper packaging cover 501 and the lower packaging cover 502. In this case, the first elastic contact pieces 901 come into contact with the first fixed contact pieces 902, the second elastic contact pieces 1001 come into contact with the second fixed contact pieces 1002, and the first fixed contact pieces 902 and the second fixed contact pieces 1002 also come into contact with the anode pin 2 and the cathode pin 3 of the LED 1 to be packaged, respectively, so that the surface-mounted heating resistors 8 and the LED 1 to be packaged form parallel connection.

After the packaging box 5 is installed, it is required to conduct power-on test on the LED 1 to be packaged in accordance with a conventional process. Since the surface-mounted heating resistors 8 are in parallel with the LED 1 to be packaged and the resistance of the surface-mounted heating resistors 8 is small, the LED 1 to be packaged is regarded as short-circuited and cannot emit light until the surface-mounted heating resistors 8 heat and melt the hot melt glue sheets 13. Under the elastic pressure of the elastic sheets 7, the melted hot melt glue sheets 13 will full fill the space between the two hot melt glue sheets 13, completely sealing the anode pin 2 and cathode pin 3 of the LED 1 to be packaged. Moreover, the melted hot melt glue will fill the gap between the upper packaging cover 501 and the lower packaging cover 502, and excess melted hot melt glue will also enter the first sealing grooves 11 and the second sealing grooves 12 via the first inner openings 1101 and the second inner openings 1201. In this case, the pressure in the packaging box 5 decreases, and the elastic sheets 7 loses their pressures and will return to original positions thereof, so that the first elastic contact pieces 901 are out of contact with the first fixed contact pieces 902, and the second elastic contact pieces 1001 are out of contact with the second fixed contact pieces 1002. As a result, the surface-mounted heating resistors 8 are powered off, and the LED 1 to be packaged is powered on and emits light, indicating the completion of packaging. This packaging solution has high sealing performance and can effectively resist moisture and oxidation. Moreover, the process of hot melt packaging is integrated into the process of power-on test, saving packaging time and improving efficiency.

The technical scope of the present invention is not limited to the contents described above. Those skilled in the art may make various variants and modifications to the above embodiments without departing from the technical idea of the present invention, and these variants and modifications should fall within the scope of the present invention.

What is claimed is:

1. A moisture-proof and oxidation-resistant LED pin connection packaging structure, characterized by, comprising: an LED to be packaged and a packaging box, wherein an anode pin and a cathode pin are arranged at the bottom of a LED to be packaged, and the anode pin and the cathode pin are connected to a power cord through solder;

the packaging box wraps joints between the anode pin and cathode pin of the LED to be packaged and the power cord; hot melt glue sheets are arranged in the packaging box, and surface-mounted heating resistors are also arranged in the packaging box; each of the surface-mounted heating resistors is electrically connected to a first trigger switch and a second trigger switch, and the first trigger switch and the second trigger switch are electrically connected to the anode pin and the cathode pin, respectively; the first trigger switches and the second trigger switches are disconnected after the hot melt glue sheets are melted.

2. The moisture-proof and oxidation-resistant LED pin connection packaging structure according to claim 1, characterized in that, the packaging box comprises an upper packaging cover and a lower packaging cover; one sides of the upper packaging cover and the lower packaging cover are rotatably connected by a hinge, and the other sides of the upper packaging cover and the lower packaging cover are snap-connected by a buckle.

3. The moisture-proof and oxidation-resistant LED pin connection packaging structure according to claim 2, characterized in that, one ends of the first trigger switches are electrically connected to the anode pin of the LED to be packaged; each first trigger switch comprises a first elastic contact piece and a first fixed contact piece, the first elastic contact piece is pasted on a thicker end of the corresponding elastic sheet, the first elastic contact piece is connected to an anode of the corresponding surface-mounted heating resistor; first sealing grooves are formed at one ends of the upper packaging cover and the lower packaging cover close to the LED to be packaged; the first fixed contact pieces are clamped in the first sealing grooves; the first fixed contact pieces are in contact with the anode pin of the LED to be packaged.

4. The moisture-proof and oxidation-resistant LED pin connection packaging structure according to claim 3, characterized in that, two first inner openings are formed in a inner side of each first sealing groove, and first outer openings are formed in a outer side of each first sealing groove; a positions of the two first inner openings and the two first outer openings respectively correspond to a positions of the anode pin and cathode pin of the LED to be packaged.

5. The moisture-proof and oxidation-resistant LED pin connection packaging structure according to claim 4, characterized in that, second sealing grooves are formed at one ends of the upper packaging cover and the lower packaging cover close to the power cord, second inner openings are formed in an inner side of each second sealing groove, and second outer openings are formed in an outer side of each second sealing groove; a positions of the second inner openings and the second outer openings correspond to a position of the power cord.

6. The moisture-proof and oxidation-resistant LED pin connection packaging structure according to claim 5, characterized in that, a diameter of the first outer openings is greater than diameters of the anode pin and the cathode pin, a diameter of the first inner openings is greater than the diameter of the first outer openings, and a diameter of the second inner openings is greater than a diameter of the second outer openings.

7. The moisture-proof and oxidation-resistant LED pin connection packaging structure according to claim 2, characterized in that, an elastic sheet is arranged on each of the upper packaging cover and the lower packaging cover, one sides of the elastic sheets are fixedly connected to the upper packaging cover and the lower packaging cover, the other three sides of the elastic sheets are separated from the upper packaging cover and the lower packaging cover, a cross section of each elastic sheet is trapezoidal, and a thickness of the one sides of the elastic sheets fixedly connected to the upper packaging cover and the lower packaging cover is less than that of the other sides opposite thereto; when the elastic sheets are not pressed, outer surfaces of the elastic sheets are flush with outer walls of the upper packaging cover and the lower packaging cover, and inner surfaces of the elastic sheets protrude from inner walls of the upper packaging cover and the lower packaging cover.

8. The moisture-proof and oxidation-resistant LED pin connection packaging structure according to claim 7, characterized in that, the surface-mounted heating resistors 8 are pasted on the inner sides of the elastic sheets.

9. The moisture-proof and oxidation-resistant LED pin connection packaging structure according to claim 2, characterized in that, one ends of the second trigger switches are electrically connected to cathodes of the surface-mounted heating resistors; one ends of the second trigger switches are electrically connected to the cathode pin of the LED to be packaged; each second trigger switch comprises a second elastic contact piece and a second fixed contact piece, the second elastic contact piece is pasted on the thicker end of the corresponding elastic sheet, and the second elastic contact piece is connected to the cathode of the corresponding surface-mounted heating resistor; the second fixed contact pieces are clamped in the first sealing grooves; the second fixed contact pieces are in contact with the cathode pin of the LED to be packaged.

10. The moisture-proof and oxidation-resistant LED pin connection packaging structure according to claim 2, characterized in that, a hot melt glue sheet is arranged in each of the upper packaging cover and the lower packaging cover, and a size of the hot melt glue sheets is consistent with internal sizes of the upper packaging cover and the lower packaging cover.

* * * * *